Dec. 2, 1952 G. R. COSS 2,619,654
GARBAGE GRINDER APPARATUS
Filed Feb. 8, 1946 5 Sheets-Sheet 1

INVENTOR.
George R. Coss.
BY
E. J. Balluff.
ATTORNEY.

Dec. 2, 1952          G. R. COSS          2,619,654

GARBAGE GRINDER APPARATUS

Filed Feb. 8, 1946          5 Sheets-Sheet 2

INVENTOR.

George R. Coss.

BY

E. G. Balluff

ATTORNEY.

INVENTOR.
George R. Coss.
BY
E. J. Balluff
ATTORNEY.

Dec. 2, 1952     G. R. COSS     2,619,654
GARBAGE GRINDER APPARATUS Filed Feb. 8, 1946     5 Sheets-Sheet 4

INVENTOR.
George R. Coss.
BY
E. J. Balluff
ATTORNEY.

Patented Dec. 2, 1952

2,619,654

UNITED STATES PATENT OFFICE 2,619,654

GARBAGE GRINDER APPARATUS

George R. Coss, Detroit, Mich., assignor to Eureka Williams Corporation, Detroit, Mich., a corporation of Michigan Application February 8, 1946, Serial No. 646,396

12 Claims. (Cl. 4—187)

This invention relates to garbage grinder apparatus and has particular reference to controls for regulating the operation of the motor and the flow of water into the grinder.

The invention has particular reference to a garbage grinder associated with the drain outlet of a sink and contemplates certain new and useful provisions for controlling or regulating the flow of water from the sink into the grinder and for correlating the operation of the motor of the grinder with the means for controlling the flow of water from the sink into the grinder.

Principal objects of the invention are to provide:

A new and improved garbage grinder apparatus.

A new and improved garbage grinder control apparatus.

A novel and efficient closure controlled switch arrangement for the motor circuit of a garbage grinder.

A novel and efficient closure for controlling the flow of water from the drain outlet of the sink to a garbage grinder.

A new and improved motor control for a garbage grinder.

Other and further objects of the invention will be apparent from the following description and claims and will be understood by reference to the accompanying drawings, of which there are five sheets, which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 6 is a horizontal sectional view taken along the line 6—6 of Fig. 2;

Figure 1:
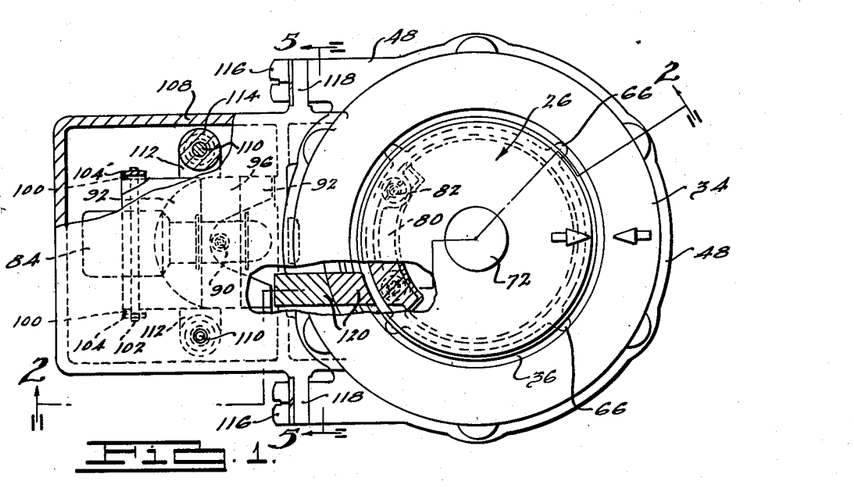
Fig. 1 is a plan view of a device embodying the invention.
Figure 2:
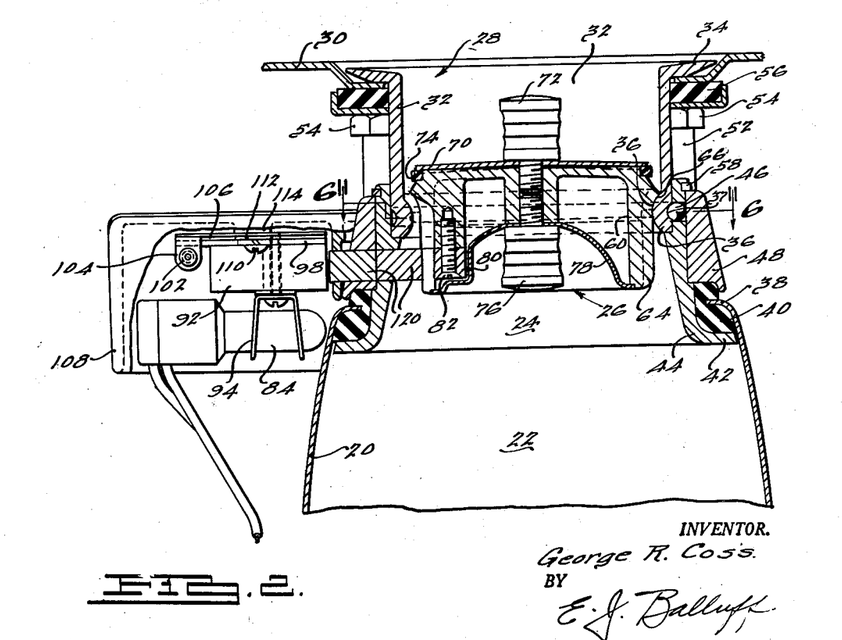
Fig. 2 is a sectional view taken generally along the staggered line 2—2 of Fig. 1, looking in the direction of the arrows.

In Figs. 1 and 2, a portion of a garbage grinding apparatus embodying the invention is illustrated. It includes the casing 20 forming a chamber 22 into which material such as garbage, bones and the like may be fed for reducing the same in order that such material may be disposed of through a drain and sewerage system to which the outlet of a sink is connected. In the present instance, the actual reducing mechanism is not illustrated, but it may comprise an electric motor driven reducing means which is constructed and arranged to reduce garbage to a pulplike mass or consistency so that it will be carried by water down the drain system. For a garbage grinder of this type, reference may be had to the prior application of George R. Coss et al., Serial No. 564,118, filed November 18, 1944, for Garbage Grinder, now issued as Patent No. 2,421,014, May 27, 1947.

The chamber 22 is provided with an inlet 24 at its upper end, such inlet being adapted to be closed by a cover or closure indicated generally at 26. The inlet 24 communicates with the outlet 28 of a sink, the bottom wall of which is indicated at 30. A collar 32 is arranged in the opening in the bottom wall of the sink and has an upper peripheral flange 34 which seats upon the bottom wall 30 of the sink around the opening therein. The collar 32 thus defines the drain outlet from the sink. The collar 32 is provided with an interior bead 36 which forms a seat or stop for the cover 26 and cooperates therewith to close the outlet 28 from the sink in one position of the cover and to permit drainage of water only from the sink outlet 28 into the chamber 22 in another position of the cover 26. The cover 26 may be entirely removed from the outlet 28 so as to permit the feeding of garbage and other material to be reduced into the chamber 22 through the inlet 24 thereof. The reducing means are arranged in the bottom of the chamber to act upon whatever material is in the chamber 22.

The casing 20 as illustrated is provided by a sheet metal shell having an inturned flange 38 at the upper end thereof which is supported by a sealing ring 40. The ring 40 in turn is supported by the outwardly turned lower flange 42 of a sleevelike member 44 which defines the inlet 24 to the chamber 22. The sleeve-like member 44 as more clearly illustrated in Fig. 6 is provided with a series of pockets in each of which a ball 46 is arranged. The collar 32, on the outside of the bead 36, is provided with an annular groove 37 into which the balls 46 project so as to hold the sleevelike member 44 assembled relative to the collar 32. The balls 46 are held into the exterior groove in the collar 32 by means of a ring 48 which bears against the balls 46. By rotationally shifting the ring 48, relative to the sleevelike member 44, pockets 50 in the ring may be brought into alignment with the balls 46, thereby permitting the same to move out of the annular groove in the collar 32, which would permit the sleeve-like member 44 to be detached from the collar 32. However, when installed, the parts are arranged as illustrated in Figs. 2 and 6.

Bolts 52 having their threaded ends secured in threaded holes in the ring 48 have their heads 54 pressing against a sealing ring 56 so as to press the same against the lower wall 30 of the sink around the opening therein so as to clamp the flange 34 of the collar 32 against the wall 30 of the sink around the opening therein; to provide a seal at the joint between the collar 32 and the sink 30 and to secure the garbage grinder in operative relationship relative to the outlet from the sink. The ring 48 when assembled is arranged between the sealing ring 40 and a snap ring 58 carried by the upper end of the sleevelike member 44.

The cover 26 as illustrated comprises a generally cylindrical body 60 having a horizontally extending disc-like imperforate wall, the outer peripheral portion 62 of which body being of smaller diameter than the inside diameter of the throat of the collar 32 or the bead 36. The outer peripheral portion 62 of the cover is provided with a series of vertical ribs 64 which function to space the cover from the throat of the collar 32 so as to define an annular space therebetween through which water from the sink outlet 28 may drain into the chamber 22. The upper ends of the ribs 64 are curved outwardly as indicated at 66 so as to seat upon the upper side of the bead 36 in order to position the stopper 26 in the sink opening, in all positions of the cover 26 in the opening. The cover is provided with a cover plate 70 which is secured to the body 60 by means of a knob 72 which forms a handle for the cover so as to permit the convenient removal thereof from the sink opening.

An annular sealing gasket 74 confined in a channel defined by the body 60 and the cover plate 70 is adapted to cooperate with the bead 36 when the cover 26 is inserted in the opening with the knob 72 on the underside of the cover so as to provide a seal between the cover 26 and the collar 32 so as to prevent the flow of water or other material from the sink into the chamber 22. The gasket 74 projects slightly beyond the cover plate 70 and is directly engageable with the inner surface of the bead 36 so as to seal across the opening 28. The ends 66 of the ribs 64 seat upon the bead 36.

The cover is provided with a knob 76 on its side opposite the knob 72 so as to provide a handle for the cover when the knob 72 is on the underside of the cover. The knob 76 like the cover 72 has a threaded stem which is threadedly secured in a threaded hole in the body 60 of the cover. A cover plate 78 is clamped against the body 60 by the knob 76.

A magnet 80 is secured to the body 60 of the cover by means of screws 82. The magnet is arranged in a recess defined by the body 60 and the cover plate 78 therefor. The magnet 80 has a curvature corresponding with that of the body 60 and extends only a short distance circumferentially thereof. The magnet 80 forms a part of a means for actuating the motor switch in accordance with the positioning of the cover 26 in the opening 28. In the position in which the cover 26 is arranged in the opening 28 as illustrated in Figs. 1, 2 and 6, the magnet 80 is arranged to close the switch thereby to close the motor circuit so that the garbage grinder will be operative when the cover 26 is positioned so as to permit drainage of water from the sink into the chamber 22. The cover, however, may be rotated about its vertical axis so as to shift the magnet 80 to a position where it cannot actuate the switch so that the cover 26 may be arranged in the opening 28 to permit drainage of water from the sink without the garbage grinder apparatus being operative.

Figures 3, 4, 5:
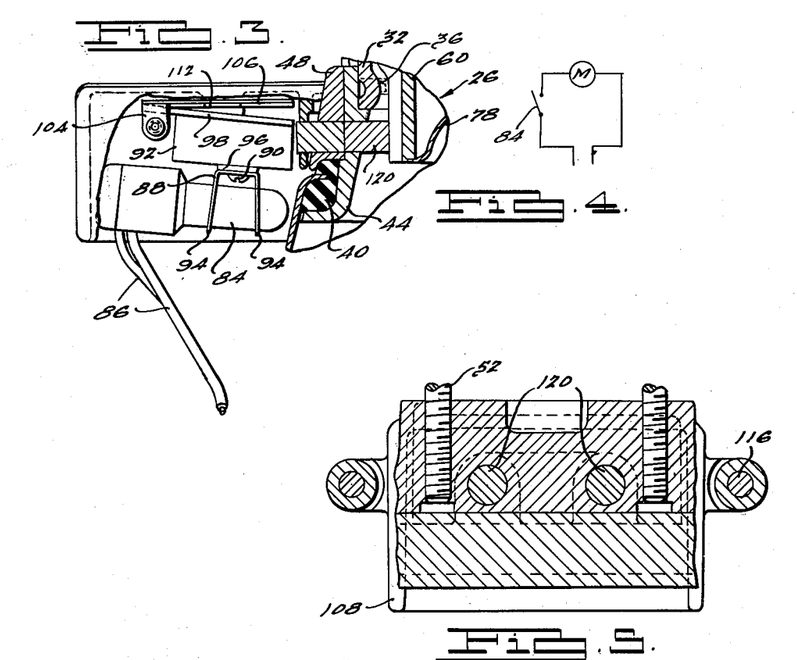
Fig. 3 is a fragmentary view similar to Fig. 2, but showing the switch parts in its open position.
Fig. 4 is a diagrammatic view of the motor circuit.
Fig. 5 is a sectional view taken generally along the line 5—5 of Fig. 1, looking in the direction of the arrows.

Fig. 3 illustrates the cover in position with the switch open, whereas with the parts assembled as shown in Figs. 1 and 2 the switch is closed. The switch comprises a mercury switch 84 to which the current conducting leads 86 are connected. The switch is carried by a bracket 88 which is affixed by a screw 90 to a horseshoe magnet 92. The bracket 88 includes a pair of arms 94 having holes therein through which the container of the switch extends, the arms being formed of spring material or biased away from each other so that the switch 84 is frictionally retained in the holes in the arms 94. The screw 90 clamps the bracket 88 against a plate 96 which is seated against the underside of the magnet 92. The upper end of the screw is threadedly secured in a hole in a plate 98 thereby clamping the magnet 92 between the plates 96 and 98.

The plate 98 at the left hand end thereof is provided with downwardly turned lugs 100. A pin 102 supported by downwardly extending lugs 104 on a plate 106 extends through aligned holes in the lugs 100 and thereby forms a pivotal support for the plate 98 and parts carried thereby about the axis of the pin 102. The plate 106 is supported from the upper horizontal wall of the switch housing 108 by screws 110, each of which extends through an opening in an outwardly projecting arm 112 provided on the plate 106 and is threadedly secured in a threaded hole formed in a boss 114 in the switch housing 108. The switch housing 108 is seated against a suitably formed part of the ring 48 and is detachably secured thereto by means of bolts 116 which extend through openings in lugs 118 formed integrally with the switch housing 108.

In order to provide a magnetic path between the magnet 92 and the magnet 80, iron cores 120 are supported in suitable openings in the ring 48 and the sleevelike member 44. Each of the iron cores is split so that the portions thereof carried by the sleevelike member 44 may be moved relative to the portions thereof carried by the ring 48 in order to permit the assembly or disassembly of the parts. However, when assembled, the cores 120 extend from a point closely adjacent the ends of the horseshoe magnet 92 to points closely adjacent the ends of the magnet 80 carried by the cover and thus are operative to transmit the magnetic force between the magnets 80 and 92 so as to position the magnet 92 and the switch 84 carried thereby in the position as illustrated in Fig. 2 for closing the switch 84 and the motor circuit controlled thereby. The cores 120 may have a very tight fit in the ring 48 and the sleeve member 44 through which they extend so as to prevent the escape of liquid from the chamber 22. Upon removal of the cover 26 from the opening or upon shifting the cover so that the magnet 80 is not positioned adjacent the cores 120, the weight of the horseshoe magnet 92 and the switch 84 will cause the switch 84 to assume the position illustrated in Fig. 3, thereby opening the motor circuit. In order to enable the user of the machine to position the cover 26 in the opening so as to close or open the switch 84, the cover 26 and the flange 34 of the collar 32 are each provided with arrows as shown in Fig. 1, which when aligned indicate that the switch of the motor circuit is closed. Shifting of the cover 26 relative to the collar 32 sufficient to materially disalign the arrows will indicate that the switch is open. It will also be appreciated that when the cover 26 is inserted with the knob 76 on top that the switch 84 will always be open as the magnet 80 will be too far removed from the cores 120 to react on the horseshoe magnet 92.

Figure 7:
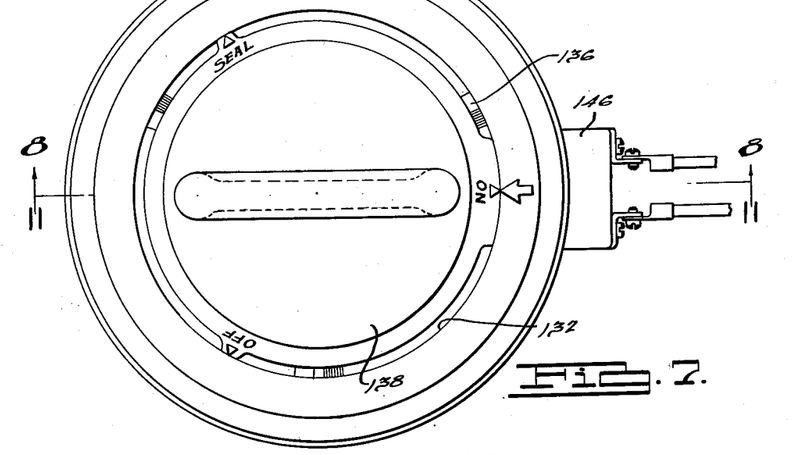
Fig. 7 is a plan view of a modified form of the invention.
Figure 8:
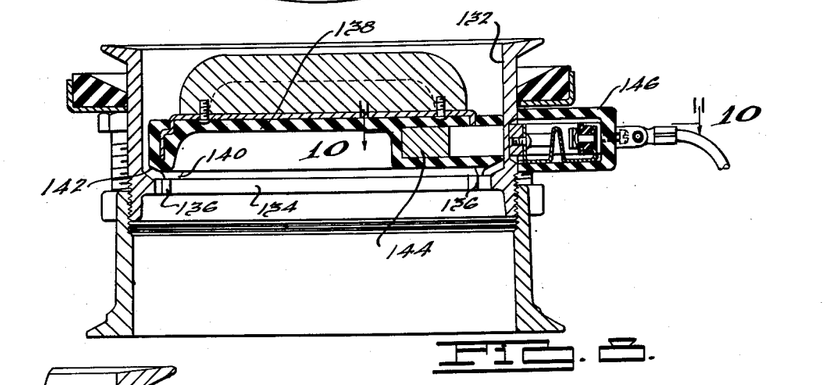
Fig. 8 is a sectional view taken along the line 8—8 of Fig. 7, looking in the direction of the arrows.
Figure 9:
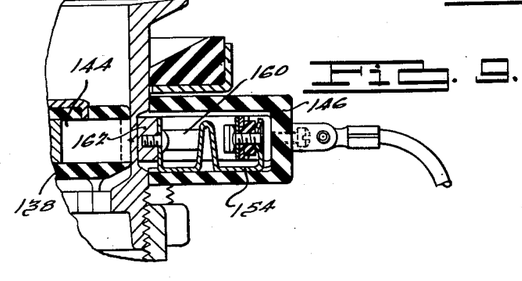
Fig. 9 is an enlarged fragmentary sectional view similar to Fig. 8.

In the modification disclosed in Figs. 7 to 12, a similar arrangement is provided but the construction is somewhat different. In this modification, the collar 132 which defines the drain outlet from the sink is provided with an inwardly extending rib 134 having a series of notches 136 therein. The rib 134 forms a seat or stop for a cover 138 which is provided with a series of feet 140. In the position in which the cover 138 is arranged in the opening defined by the collar 132 as shown in Figs. 7, 8 and 9, the feet 140 of the cover are supported upon the rib 134. As the diameter of the cover is less than that of the inside diameter of the collar, it will be appreciated that space is provided between the cover 138 and the inside of the collar 132 through which water may drain from the sink into the inlet to the grinder. The notches 136 are adapted to receive the feet 140 of the cover 138 so as to permit the annular sealing surface 142 of the cover 138 to seat upon the upper face of the rib 134 thereby to seal the opening against the passage of liquid from the sink into the chamber 22 of the garbage grinder. This will occur when the position marked "seal" on the cover 138 is positioned opposite the arrow on the flange of the collar 132. When the cover 138 is arranged in the drain opening as shown in Figs. 7, 8 and 9, the switch for the motor circuit is closed. The cover in this case carries a magnet 144 which is adapted to be brought into operative relationship with a magnet movable with the contacts of the switch for closing the same as hereinafter described.

Figure 10:
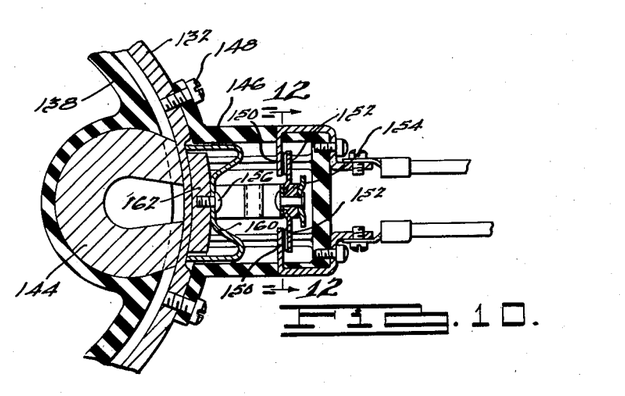
Fig. 10 is a fragmentary sectional view taken along the line 10—10 of Fig. 8.

The switch parts are arranged externally of the drain connection between the sink and the garbage grinder chamber 22 in an insulating housing 146 which is detachably secured to the outer surface of the collar 132 by means of screws 148. The housing is provided with a pair of contacts 150 to which current conductors are suitably connected. A pair of electrically connected movable contacts 152 are insulated from and supported by a slide member 154 which is connected to the center of an M-shaped spring 160. The screw 156 functions to clamp a magnet 162 to the center of the spring 160. The magnet 162 is positioned in a recess formed in the outer wall of the collar 132, which is formed of non-magnetic material such as brass. When the magnet 144 and the cover are positioned as illustrated in Fig. 10 relative to the magnet 162, the magnet 162 will function to hold the movable switch contacts 152 in engagement with the stationary switch contacts 150 so as to bridge the same, thereby closing the motor circuit. However, upon removal of the cover 138 or shifting of the magnet 144 out of the field of the magnet 162, the spring 160 will move the magnet 162 and the slide member 154 to the right, thereby to disengage the contacts 150 and 152, thereby opening the switch and the motor circuit. In order to indicate the "on" position of the cover relative to the arrow on the collar 132, the cover is provided with the marking "on" which when aligned with the arrow on the collar 132 indicates that the motor switch is closed. In this position, drainage of water into the garbage grinder will be permitted.

Figure 11:
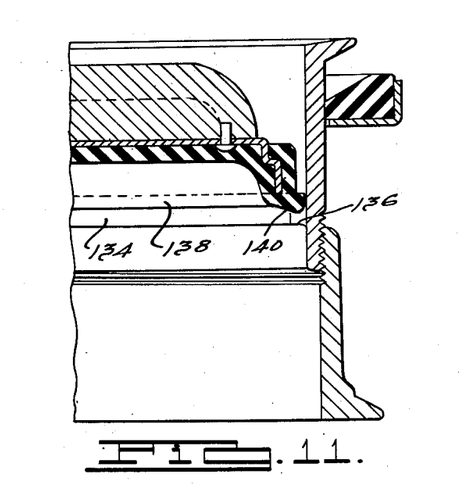
Fig. 11 is an enlarged fragmentary sectional view illustrating the cover in a different position than that shown in Figs. 7 to 10.
Figure 12:
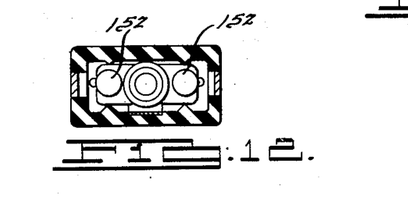
Fig. 12 is a sectional view taken along the line 12—12 of Fig. 10.

The cover 138 is also provided with the marking "off" which when aligned with the arrow on the collar 132 will indicate that the motor switch is open. In this position, drainage of water from the sink into the garbage grinder will be permitted. When the seal position on the cover 132 is aligned with the arrow on the collar 132, the drain opening from the sink will be closed. In this position, the cover 138 will be arranged as illustrated in Fig. 11. In this position, the garbage grinder will be stopped and the escape of water from the sink through the drain outlet therefrom will be prevented.

Figure 13:
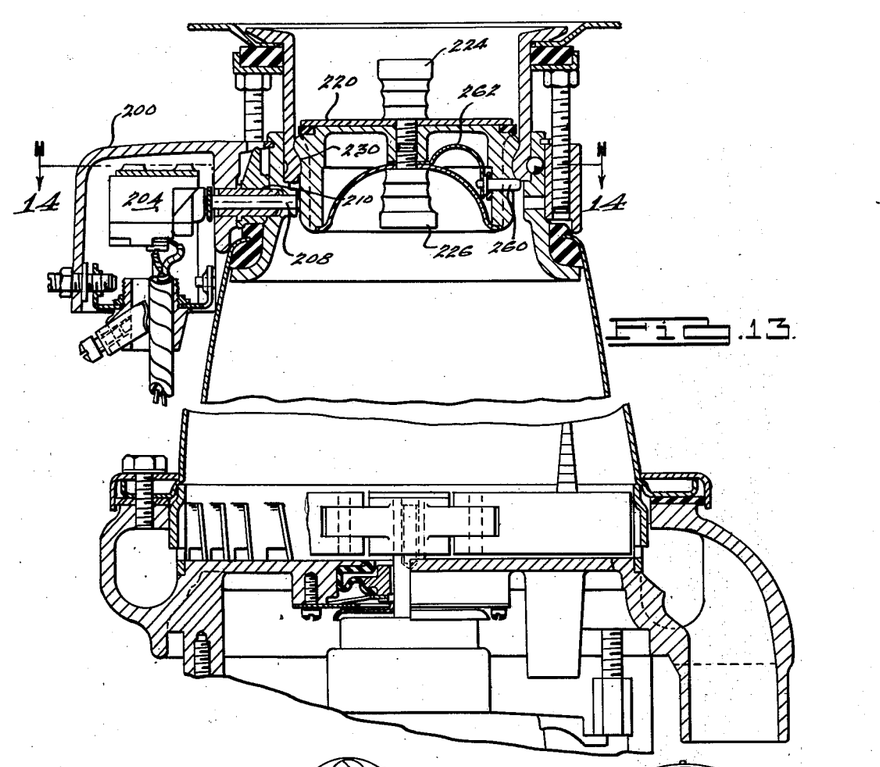
Fig. 13 is a view similar to Fig. 2 illustrating a modified form of the invention.
Figure 14:
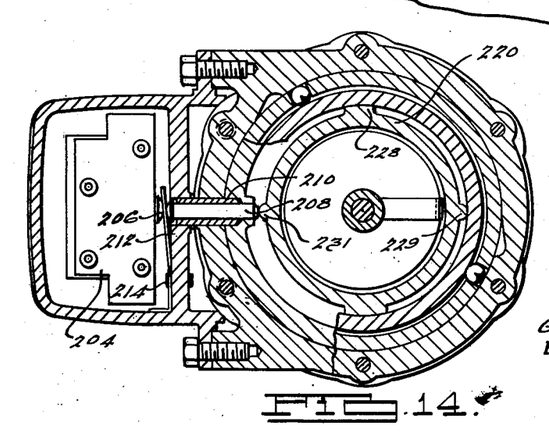
Fig. 14 is a sectional view taken along the line 14—14 of Fig. 13.
Figure 15:
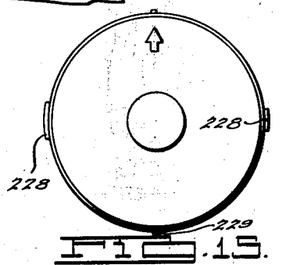
Fig. 15 is a plan view of the cover.

In the modification illustrated in Figs. 13, 14 and 15, the switch 204 for controlling the motor circuit is mechanically and positively actuated. The switch 204 is mounted in a housing 200 and is of the type in which the contacts are normally open. It includes a pin 206 which upon being moved to the left is adapted to engage or close the switch contacts so as to close the motor circuit. In Figs. 13 and 14, the pin 206 is shown in position corresponding with closed position of the switch. The pin 206 is adapted to be actuated by a pin 208 which is slidably mounted in a bushing 210 arranged in the wall defining the inlet to the garbage grinder chamber. A spring 212 anchored at 214 to a wall of the housing 200 biases the pin 208 to the right so that the pin 206 and the switch contacts may move to their open position. The pin 208 is arranged so that one end thereof is adapted to be engaged and actuated by the closure 220 for the grinder. The closure 220 is essentially like that disclosed in the previous modifications except that it does not include any magnet, but rather it is provided with a rib 231 which is adapted to engage the pin 208 and to move the same to close the switch 204 when the cover 220 is positioned in the opening to the grinder as illustrated in Figs. 13 and 14. In this position, the cover is adapted to permit the flow of water from the sink through the outlet thereof into the grinder chamber. To obtain this result, the outer periphery of the cover 220 is provided with a series of ribs 228 and 229 which seat upon the bead 230 in the throat of the opening and space the outside of the cover from the wall of the opening defining the throat so as to permit the flow of water therebetween.

If the cover 220 is rotationally shifted so that the rib 231 is out of alignment with the pin 208, the switch 204 will be open. However, at such time the flow of water between the cover 220 and the wall defining the opening will still be provided for. The cover in this case is provided with handles 224 and 226 so that it may be turned over as described in the previous modifications, in order that the outlet from the sink may be sealed.

In Figs. 13 and 14, the cover is provided with a slidable pin 260 which projects from the cover and is adapted to engage an internal shoulder in the throat of the outlet from the sink for detachably securing cover 220 in such opening. The pin 260 functions as a detent and is backed up by a spring 262.

From the foregoing, it will be observed that I have provided in each of the forms of electric motor driven garbage grinders a chamber adapted to receive material to be reduced and having an inlet defined by a cylindrical passage, said passage having a circumferentially extending shoulder, a cover including a horizontally extending disc-like imperforate wall of lesser area than the passage above the shoulder constructed so that it may be fitted in one position in the passage so that the periphery of said wall will cooperate with the shoulder to seal the passage against the flow of liquid through the passage into the chamber, said cover having projections on its periphery engageable with said shoulder to position said cover in another position in and relative to said passage so as to define an annular opening for flow of liquid through said passage into the chamber while obstructing the inlet to said chamber to prevent the ingress of material other than liquids to said chamber, or the egress through said inlet of materials being acted upon in said chamber, an electric switch arranged in the circuit of the electric motor for the grinder and positioned adjacent the inlet and exteriorly of the passage, said cover having means operable in the last mentioned position of the cover in the passage for actuating the switch to close the motor circuit.

In lieu of employing two permanent magnets in the embodiments shown in Figs. 1–12, either one might be a soft iron armature.

While I have illustrated and described a preferred embodiment of my invention, it is understood that this is capable of modification and I, therefore, do not wish to be limited to the precise details set forth but desire to avail myself of such changes and alterations as fall within the purview of the following claims.

I claim:

1. In an electric motor driven garbage grinder, a chamber adapted to receive material to be reduced and having an inlet defined by a cylindrical passage, a cover including a horizontally extending disc-like imperforated wall constructed so that it may be fitted in one position in said passage so as to seal the passage against the flow of liquid through said passage into said chamber, a shoulder in said passage, a part of said cover being engagable with said shoulder in another position of said cover in and relative to said passage so as to prevent said cover from sealing said passage against flow of liquid through said passage into said chamber while obstructing the inlet to said chamber to prevent the ingress of material other than liquids to said chamber or the egress through said inlet of materials being acted upon in said chamber, an electric switch arranged in the circuit of the electric motor for the grinder and positioned adjacent said inlet, and means responsive upon a certain angular positioning of said cover in said last mentioned position in said passage for actuating said switch to close the motor circuit.

2. In an electric motor driven garbage grinder, a chamber adapted to receive material to be reduced and having an inlet defined by a cylindrical passage, said passage having a circumferentially extending shoulder, a cover including a horizontally extending disc-like imperforate wall constructed so that it may be fitted in one position in said passage so as to cooperate with said shoulder to seal the passage against the flow of liquid through said passage into said chamber, means on said cover engageable with said shoulder in another position of said cover in and relative to said passage so as to prevent said cover from sealing said passage against flow of liquid through said passage into said chamber while obstructing the inlet to said chamber to prevent the ingress of material other than liquids to said chamber or the egress through said inlet of materials being acted upon in said chamber, an electric switch arranged in the circuit of the electric motor for the grinder and positioned adjacent said inlet, and means responsive to the angular positioning of said cover in said last mentioned position in said passage for actuating said switch to close the motor circuit.

3. In an electric motor driven garbage grinder, a chamber adapted to receive material to be reduced and having an inlet, a cover including a horizontally extending disc-like imperforate wall constructed so that it may be fitted in one position in said inlet so as to seal the inlet against the flow of liquid through said inlet into said chamber, means to position said cover in another position in and relative to said inlet so as to prevent said imperforate wall from sealing said inlet against flow of liquid through said inlet into said chamber while obstructing the inlet to said chamber to prevent the ingress of material other than liquids to said chamber or the egress through said inlet of materials being acted upon in said chamber, an electric switch arranged in the circuit of the electric motor for the grinder and positioned adjacent said inlet, and means including a plunger projecting into said inlet and responsive to a certain angular positioning of said cover in said last mentioned position in said inlet for actuating said switch to close said motor circuit.

4. In an electric motor driven garbage grinder, a chamber adapted to receive material to be reduced and having an inlet defined by a cylindrical passage, said passage having a circumferentially extending shoulder, a cover including a generally cylindrical body portion and a horizontally extending disc-like imperforate wall at one end thereof of lesser area than the passage above said shoulder constructed so that it may be fitted in one position in said passage so as to cooperate with said shoulder to seal the passage into said chamber, means on said cylindrical portion for positioning said imperforate wall in spaced relationship with said shoulder in another position of said cover in and relative to said passage so as to prevent said cover from sealing said passage against flow of liquid through said passage into said chamber while obstructing the inlet to said chamber to prevent the ingress of material other than liquids to said chamber or the egress through said inlet of materials being acted upon in said chamber, an electric switch arranged in the circuit of the electric motor for the grinder and positioned adjacent said inlet, a plunger projecting through said inlet from said switch to said cover, a spring associated with said plunger for projecting the same outwardly against said cover, and a rib projecting from said cover and engageable with said plunger in the said last mentioned position of said cover for moving said plunger axially for actuating said switch.

5. In an electric motor driven garbage grinder, a chamber adapted to receive material to be reduced and having an inlet defined by a cylindrical passage, said passage having a circumferentially extending shoulder, a cover including a generally cylindrical body portion and a horizontally extending disc-like imperforate wall at one end thereof of lesser area than the passage above said shoulder constructed so that it may be fitted in one position in said passage so that the periphery of said wall will seat on said shoulder to seal the passage against the flow of liquid through said passage into said chamber, said cover having projections on said cylindrical portion engageable with said shoulder to position said imperforate wall in another position in and relative to said passage so as to define an annular opening about the exterior of said cylindrical portion providing for flow of liquid through said passage into said chamber while obstructing the inlet to said chamber to prevent the ingress of material other than liquids to said chamber or the egress through said inlet of materials being acted upon in said chamber, an electric switch arranged in the circuit of the electric motor for the grinder and positioned adjacent said inlet and externally of said passage, a plunger projecting through said inlet from said switch to said cover, a rib projecting from said cover and engageable with said plunger in said last mentioned position of said cover for moving said plunger axially for actuating said switch.

6. In an electric motor driven garbage grinder, a chamber adapted to receive material to be reduced and having an inlet, a cover constructed so that it may be fitted in one position in said inlet so as to seal the inlet against the flow of liquid through said inlet into said chamber, means to position said cover in another position in and relative to said inlet so as to prevent said cover from sealing said inlet against flow of liquid through said inlet into said chamber while obstructing the inlet to said chamber to prevent the ingress of material other than liquids to said chamber or the egress through said inlet of materials being acted upon in said chamber, an electric switch arranged in the circuit of the electric motor for the grinder and positioned adjacent said inlet, and magnetic means operable when said cover is in said last mentioned position in said inlet for actuating said switch to close the motor circuit.

7. A device according to the construction set forth in claim 6 wherein said magnetic means comprises a magnet on said cover and a magnet associated with said switch and positioned closely adjacent and externally of said inlet and operable when said cover is in said inlet in said last mentioned position with said magnets in close proximity to actuate said switch as aforesaid.

8. In an electric motor driven garbage grinder, a chamber adapted to receive material to be reduced and having an inlet, a cover including a horizontally extending disc-like imperforate wall constructed so that it may be fitted in one position in said inlet so as to seal the inlet against the flow of liquid through said inlet into said chamber, means to position said cover in an inverted position in and relative to said inlet so as to prevent the ingress of material other than liquids to said chamber or the egress through said inlet of materials being acted upon in said chamber, an electric switch arranged in the circuit of the electric motor for the grinder and positioned adjacent said inlet, said cover having means operable in one angular position of said cover in said inverted position of said cover in said inlet for actuating said switch to close the motor circuit.

9. A device according to the construction set forth in claim 8 wherein said means comprise a magnet on said cover and a magnet associated with said switch and positioned closely adjacent and exteriorly of said inlet and operable when said cover is in said inlet in said last-mentioned position with said magnets in close proximity to actuate said switch as aforesaid.

10. In an electric motor driven garbage grinder, a chamber adapted to receive material to be reduced and having an inlet, a cover including a generally cylindrical body portion and a horizontally extending disc-like imperforate wall constructed so that it may be fitted in one position in said inlet so as to seal the inlet against the flow of liquid through said inlet into said chamber, means on said cylindrical portion to position said cover in an inverted position in and relative to said inlet so as to prevent said imperforate wall from sealing said inlet against flow of liquid through said inlet into said chamber while obstructing the inlet to said chamber to prevent the ingress of material other than liquids to said chamber or the egress through said inlet of materials being acted upon in said chamber, an electric switch arranged in the circuit of the electric motor for the grinder and positioned adjacent said inlet, and means including a plunger projecting into said inlet and responsive to the angular positioning of said cover in said last-mentioned position in said inlet for actuating said switch to close the motor circuit.

11. In an electric motor driven garbage grinder, a chamber adapted to receive material to be reduced and having an inlet defined by a cylindrical passage formed to provide an annular seat, a cover adapted to be disposed in a plurality of operative positions relative to said passage, said cover including a transversely extending disc shape imperforate wall having a cylindrical body projecting laterally and an annular sealing ring projecting outwardly both from adjacent the periphery thereof, said cylindrical body being provided with drain means disposed inwardly of said sealing ring and exteriorly of said cylindrical body, said cover being adapted for rotation and for bodily movement with respect to said passage into a plurality of angular and axial positions respectively, spacing means associated with said cylindrical body and said inlet for supporting said cover in one axial position within said inlet, said spacing means in said one position supporting said sealing ring in spaced relation to said seat with said drain means communicating with the space between said sealing ring and said seat and with said passage inwardly of said cover, said cover in said one axial position being movable into a plurality of angular positions, an electric switch arranged in the circuit of the electric motor for said grinder and positioned adjacent said inlet, and means responsive to the positioning of said cover in one of said angular positions for actuating said switch for closing said circuit.

12. In an electric motor driven garbage grinder, a chamber adapted to receive material to be reduced and having an inlet defined by a cylindrical passage formed to provide an annular seat, a cover adapted to be disposed in a plurality of operative positions relative to said passage, said cover including a transversely extending disc shape imperforate wall having a cylindrical body projecting laterally and an annular sealing ring projecting outwardly both from adjacent the periphery thereof, said cylindrical body being provided with drain means disposed inwardly of said sealing ring and exteriorly of said cylindrical body, said cover being adapted for rotation and for bodily movement with respect to said passage into a plurality of angular and axial positions respectively, spacing means associated with said cylindrical body and said inlet for supporting said cover in one axial position within said inlet, said spacing means in said one position supporting said sealing ring in spaced relation to said seat with said drain means communicating with the space between said sealing ring and said seat and with said passage inwardly of said cover, said cover in said one axial position being movable into a plurality of angular positions, an electric switch arranged in the circuit of the electric motor for said grinder and positioned adjacent said inlet, and means responsive to the positioning of said cover in one of said angular positions for actuating said switch for closing said circuit, said cover being movable into a different axial position than said one axial position for rendering said spacing means inoperative and for closing said sealing ring upon said seat.

GEORGE R. COSS.

REFERENCES CITED

The following references are of record in the file of this patent:

UNITED STATES PATENTS

| Number | Name | Date |
|---|---|---|
| 2,225,171 | Hammes | Dec. 17, 1940 |
| 2,244,402 | Powers | June 3, 1941 |
| 2,428,420 | Green | Oct. 7, 1947 |
| 2,484,459 | Osborn | Oct. 11, 1949 |